United States Patent
Senmyo

(10) Patent No.: US 11,783,823 B2
(45) Date of Patent: Oct. 10, 2023

(54) VEHICLE CONTROL APPARATUS

(71) Applicant: SUBARU CORPORATION, Tokyo (JP)

(72) Inventor: Katsuo Senmyo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 290 days.

(21) Appl. No.: 16/943,091

(22) Filed: Jul. 30, 2020

(65) Prior Publication Data

US 2021/0074287 A1    Mar. 11, 2021

(30) Foreign Application Priority Data

Sep. 10, 2019 (JP) .................................. 2019-164723

(51) Int. Cl.
| | |
|---|---|
| *G10L 15/22* | (2006.01) |
| *G10L 15/24* | (2013.01) |
| *G06V 20/59* | (2022.01) |
| *G06V 40/16* | (2022.01) |

(52) U.S. Cl.
CPC ............ *G10L 15/22* (2013.01); *G06V 20/597* (2022.01); *G10L 15/24* (2013.01); *G06V 40/16* (2022.01); *G10L 2015/223* (2013.01); *G10L 2015/227* (2013.01)

(58) Field of Classification Search
CPC ...... B60R 16/0373; B60W 2040/0818; B60W 2540/21
See application file for complete search history.

(56) References Cited

U.S. PATENT DOCUMENTS

| | | | |
|---|---|---|---|
| 6,256,558 B1 * | 7/2001 | Sugiura ................. | G01C 21/26 701/1 |
| 9,171,544 B2 * | 10/2015 | Paik ...................... | G06F 16/639 |
| 9,919,648 B1 * | 3/2018 | Pedersen .............. | G06V 20/597 |
| 10,322,728 B1 * | 6/2019 | Porikli ................. | G06V 10/764 |
| 2003/0096593 A1 * | 5/2003 | Naboulsi ............... | G08B 21/06 455/565 |

(Continued)

FOREIGN PATENT DOCUMENTS

| | | |
|---|---|---|
| JP | S60-045448 A | 3/1935 |
| JP | 2007-122579 A | 5/2007 |

(Continued)

OTHER PUBLICATIONS

Notice of Reasons for Refusal issued in Japanese Patent Application No. 2019-164723 dated Jun. 27, 2023, with machine translation.

*Primary Examiner* — Seong-Ah A Shin
(74) *Attorney, Agent, or Firm* — TROUTMAN PEPPER HAMILTON SANDERS LLP

(57) ABSTRACT

A vehicle control apparatus to be used in a vehicle controllable on the basis of a voice input includes a determination unit and an input unit. The determination unit is configured to determine whether a main operator of the vehicle is in a predetermined state where the main operator is not possible to perform an operation or is not performing an operation. The input unit is configured to accept an operational input based on a voice of the main operator, as well as to accept an operational input based on a voice of a passenger of the vehicle in a case where the determination unit has determined that the main operator is in the predetermined state.

20 Claims, 4 Drawing Sheets

(56) References Cited

U.S. PATENT DOCUMENTS

| | | | |
|---|---|---|---|
| 2006/0149428 A1* | 7/2006 | Kim | B60W 40/09 |
| | | | 701/1 |
| 2015/0166058 A1* | 6/2015 | Mizutani | B60K 35/00 |
| | | | 701/1 |
| 2015/0283999 A1* | 10/2015 | Igarashi | G08G 1/166 |
| | | | 701/1 |
| 2015/0328985 A1* | 11/2015 | Kim | G08B 21/06 |
| | | | 180/272 |
| 2018/0063318 A1* | 3/2018 | Muralidharan | H04M 1/72463 |
| 2018/0342329 A1* | 11/2018 | Rufo | G08B 25/10 |
| 2019/0115016 A1* | 4/2019 | Seok | G10L 15/22 |
| 2020/0062246 A1* | 2/2020 | Park | B60Q 1/44 |
| 2020/0134338 A1* | 4/2020 | Wang | B60Q 1/507 |
| 2020/0227037 A1* | 7/2020 | Kline | G10L 15/22 |
| 2020/0269848 A1* | 8/2020 | Kang | G06N 20/00 |
| 2020/0310528 A1* | 10/2020 | Upmanue | A61B 5/4803 |
| 2020/0339142 A1* | 10/2020 | Aggarwal | G10L 15/22 |
| 2021/0061098 A1* | 3/2021 | Parker | G08G 1/0965 |
| 2021/0101589 A1* | 4/2021 | Jeon | B60W 60/007 |
| 2021/0107488 A1* | 4/2021 | Jeong | B60W 40/10 |
| 2021/0142802 A1* | 5/2021 | Furuyama | G10L 15/22 |
| 2021/0210086 A1* | 7/2021 | Han | G06F 3/16 |
| 2021/0334562 A1* | 10/2021 | Park | B60W 50/00 |

FOREIGN PATENT DOCUMENTS

| | | |
|---|---|---|
| JP | 2011-57134 A | 3/2011 |
| JP | 2017-159692 A | 9/2017 |
| JP | 2018-138449 A | 9/2018 |
| JP | 2019-43365 A | 3/2019 |
| WO | 2019/069731 A1 | 4/2019 |

* cited by examiner

VEHICLE CONTROL APPARATUS

CROSS-REFERENCE TO RELATED APPLICATIONS

The present application claims priority from Japanese Patent Application No. 2019-164723 filed on Sep. 10, 2019, the entire contents of which are hereby incorporated by reference.

BACKGROUND

The disclosure relates to a vehicle control apparatus.

Various kinds of apparatuses have been proposed to serve as vehicle control apparatuses. Such a vehicle control apparatus recognizes a voice of a speaker to control operations of devices mounted in a vehicle. For example, reference is made to Japanese Unexamined Patent Application Publication (JP-A) Nos. S60-045448 and 2017-159692.

SUMMARY

An aspect of the disclosure provides a vehicle control apparatus to be used in a vehicle controllable on the basis of a voice input. The vehicle control apparatus includes a determination unit and an input unit. The determination unit is configured to determine whether a main operator of the vehicle is in a predetermined state where the main operator is not possible to perform an operation or is not performing an operation. The input unit is configured to accept an operational input based on a voice of the main operator, as well as to accept an operational input based on a voice of a passenger of the vehicle in a case where the determination unit has determined that the main operator is in the predetermined state.

An aspect of the disclosure provides a vehicle control apparatus to be used in a vehicle controllable on the basis of a voice input. The vehicle control apparatus includes circuitry. The circuitry is configured to determine whether a main operator of the vehicle is in a predetermined state where the main operator is not possible to perform an operation or is not performing an operation. The circuitry is configured to accept an operational input based on a voice of the main operator. The circuitry is configured to accept an operational input based on a voice of a passenger of the vehicle in a case where the main operator has been determined to be in the predetermined state.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
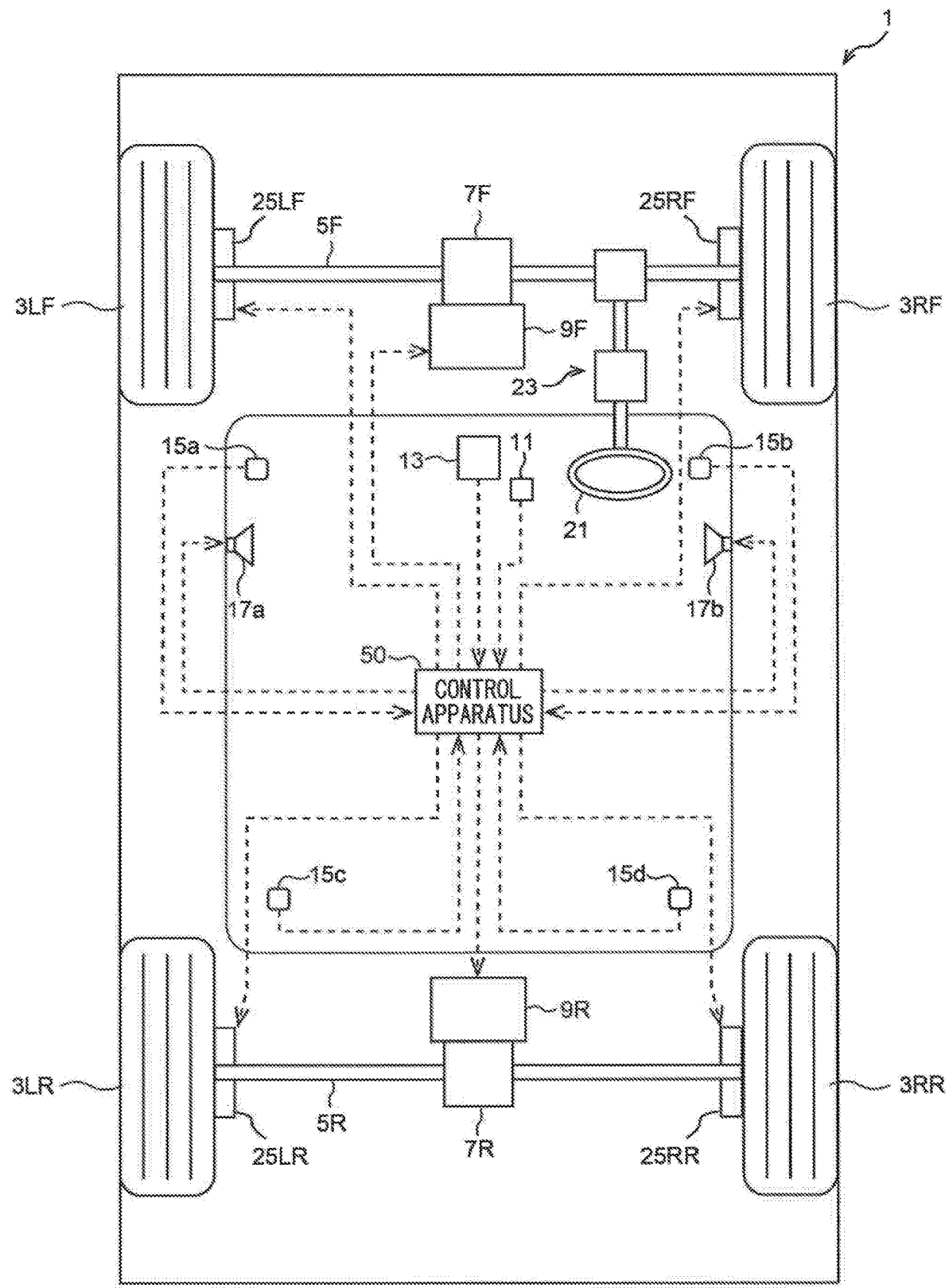
FIG. 1 is a schematic view of a configuration example of a vehicle in which a vehicle control apparatus according to an example embodiment of the disclosure is mounted.

In the following, some example embodiments of the disclosure are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

1. Overall Configuration Example of Vehicle

An overall configuration example of a vehicle in which a vehicle control apparatus according to an example embodiment of the disclosure is applied will now be described below with reference to FIG. 1. FIG. 1 is a schematic view of a configuration example of a vehicle 1 in which a vehicle control apparatus 50 is mounted.

The vehicle 1 in which the vehicle control apparatus 50 is to be applied may represent the vehicle 1 in which some or all of devices used for travel controlling of the vehicle 1 are to be controlled on the basis of a voice input. In the example embodiment, an example of the vehicle 1 will be described below. In the example, acceleration and deceleration of the vehicle 1 may at least be controlled on the basis of a voice input. Such a control may constitute part of the travel controlling for the vehicle 1. In the example embodiment described below, a main operator of the vehicle 1 may therefore mean a driver sitting on a driver's seat. The driver may manually perform a rotation operation of a steering wheel.

In the example to be described in the example embodiment, the vehicle control apparatus 50 may be applied in the electric vehicle 1 including two drive motors, i.e., a front wheel drive motor 9F and a rear wheel drive motor 9R. The vehicle may not however be limited to this example.

For example, the vehicle may be an electric vehicle in which one drive motor drives all wheels. The vehicle may be an electric vehicle in which one drive motor drives some of wheels, i.e., front wheels or rear wheels. The vehicle may be an electric vehicle including in-wheel motors respectively mounted in drive wheels. In this case, the electric vehicle may be an electric vehicle including a motor serving as an electric generator. The electric vehicle may be a fuel cell vehicle including a fuel cell serving as an electric generator.

Furthermore, the vehicle is not limited to an electric vehicle. The vehicle may be a vehicle including an internal combustion engine serving as a drive source. The vehicle may be a hybrid electric vehicle including an internal combustion engine and a drive motor serving as drive sources.

The vehicle 1 may include devices that are used for travel controlling of the vehicle 1 (hereinafter also referred to as "travel system devices") and devices that are not directly used for travel controlling (hereinafter also referred to as "non-travel system devices"). As illustrated in FIG. 1, the vehicle 1 may include, as such travel system devices, the front wheel drive motor 9F, the rear wheel drive motor 9R, a steering system 23, and brake apparatuses 25LF, 25RF, 25LR, and 25RR. In a case where it is not necessary to specifically distinguish the brake apparatuses 25LF, 25RF, 25LR, and 25RR from each other, a generic term of a brake apparatus 25 may be used.

The front wheel drive motor 9F may be driven with electric power supplied from a non-illustrated battery. Torque of the front wheel drive motor 9F may then be transmitted to a front wheel drive axle 5F via a differential mechanism 7F. The rear wheel drive motor 9R may as well be driven with the electric power supplied from the non-illustrated battery. Torque of the rear wheel drive motor 9R may then be transmitted to a rear wheel drive axle 5R via a differential mechanism 7R. The front wheel drive motor 9F and the rear wheel drive motor 9R may each have a regenerative feature. Under the regenerative feature, the front wheel drive motor 9F and the rear wheel drive motor 9R may receive rotational torque of drive wheels 3LF, 3RF, 3LR, and 3RR during deceleration of the vehicle 1, generating electric power. How the front wheel drive motor 9F and the rear wheel drive motor 9R are driven may be controlled in accordance with the vehicle control apparatus (hereinafter also simply referred to as a "control apparatus") 50 controlling a non-illustrated inverter.

The front wheel drive axle 5F may be provided with the steering system 23. In accordance with a rotation operation of the steering wheel, orientation of the front wheels 3LF and 3RF may be changed.

The brake apparatuses 25LF, 25RF, 25LR, and 25RR may respectively provide braking forces to the front, rear, left, and right drive wheels, i.e., the drive wheels 3LF. 3RF, 3LR, and 3RR. The brake apparatuses 25LF, 25RF, 25LR, and 25RR may be used together, as the front wheel drive motor 9F and the rear wheel drive motor 9R generate braking forces on the basis of regenerative braking. The brake apparatuses 25LF, 25RF, 25LR, and 25RR may be hydraulic brake apparatuses or electric brake apparatuses. In a case of hydraulic brake apparatuses, for example, the control apparatus 50 may control a hydraulic unit configured to control hydraulic pressure to be supplied to the brake apparatuses 25LF, 25RF, 25LR, and 25RR. A braking force may thus be controlled.

The vehicle 1 may further include an operational intervention switch 11, a camera 13, microphones 15a, 15b, 15c, and 15d, and loudspeakers 17a and 17b. In a case where it is not necessary to specifically distinguish the microphones 15a, 15b, 15c, and 15d from each other, a generic term of a microphone 15 may be used. In a case where it is not necessary to specifically distinguish the loudspeakers 17a and 17b from each other, a generic term of a loudspeaker 17 may be used.

The camera 13 may be mounted to capture an image in a cabin. The camera 13 may include an image sensor such as a charge-coupled device (CCD) or a complementary metal-oxide semiconductor (CMOS) to generate an image signal. The camera 13 may include one camera. The camera 13 may otherwise be a stereo camera including a pair of left and right cameras. The image signal acquired by the camera 13 may be outputted to the control apparatus 50. The control apparatus 50 may perform predetermined processing on the basis of the image signal outputted from the camera 13.

The microphone 15 may collect a sound or a voice in the cabin. In the example embodiment, the four microphones 15a to 15d may respectively be piezoelectric microphones mounted at around four corners in the cabin. The microphones 15a to 15d may each be configured to detect a direction of a collected sound or a collected voice. A voice signal acquired by the microphone 15 may be sent to the control apparatus 50. The control apparatus 50 may perform predetermined processing on the basis of the voice signal sent from the microphone 15.

The loudspeaker 17 may generate and emit a sound or a voice toward the inside of the cabin. The loudspeaker 17 may operate on the basis of a voice signal inputted from the control apparatus 50 to generate and emit a sound or a voice.

The operational intervention switch 11 may be provided to be operable in the cabin. The operational intervention switch 11 may be operated by an occupant (a passenger) other than the driver (the main operator) sitting on the driver's seat in the cabin in a case where acceptance of an input operation for travel controlling of the vehicle 1 to be inputted via a voice input from a passenger is permitted. A signal indicative of turning on or off of the operational intervention switch 11 may be outputted to the control apparatus 50. It is to be noted that, to prevent the operational intervention switch 11 from being turned on unintentionally or accidentally, the operational intervention switch 11 may be provided on an instrument panel, for example.

Although not illustrated, such various sensors and devices may be additionally included that are used for processing of determining whether the driver (the main operator) is in a driving incapability state. The sensors and devices may otherwise be worn by the main operator. For example, a biological sensor configured to detect biological information of the driver may be included. Non-limiting examples of the biological sensor may include known sensors such as a blood pressure sensor, a body temperature sensor, a heart rate meter, an electrocardiogram sensor, a pulse sensor, and an electroencephalogram sensor. A device used for the determination processing described above may be a camera. On the basis of outputs from the sensors and devices, the control apparatus 50 may detect abnormality in the main operator's blood pressure, body temperature, heart rate, pulse, electroencephalogram, or face color, and medical symptom such as epilepsy or heart stroke.

2. Configuration Example of Vehicle Control Apparatus

Figure 2:
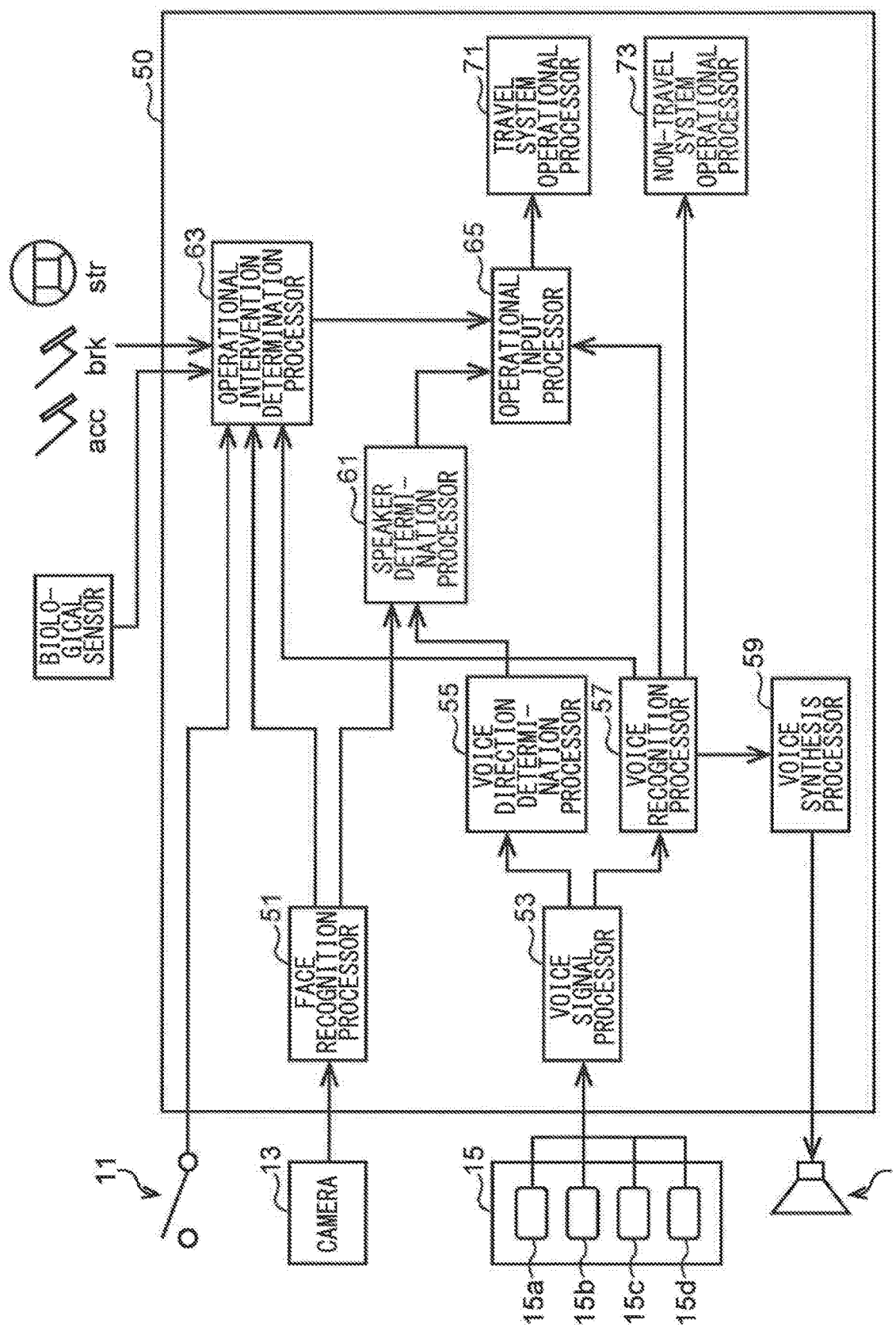
FIG. 2 is a block diagram of a configuration of the vehicle control apparatus according to the example embodiment.

Next, a configuration example of the vehicle control apparatus 50 according to the example embodiment will be described below with reference to FIG. 2. FIG. 2 is a block diagram of a configuration of the control apparatus 50.

The control apparatus 50 may include, for example, a processor such as a central processing unit (CPU) or a micro processing unit (MPU), an electric circuit, and a storage device such as a random access memory (RAM) and a read only memory (ROM). The control apparatus 50 may partially or wholly be updatable firmware, for example. The control apparatus 50 may otherwise partially or wholly be a program module to be executed under an instruction to be provided from a CPU, for example.

The control apparatus 50 may include a face recognition processor 51, a voice signal processor 53, a voice direction determination processor 55, a voice recognition processor 57, a voice synthesis processor 59, a speaker determination processor 61, an operational intervention determination processor 63, an operational input processor 65, a travel system operational processor 71, and a non-travel system operational processor 73. The components described above may be wholly or partially achieved upon execution of a computer program by the processor.

On the basis of an image signal outputted from the camera 13, the face recognition processor 51 may execute face recognition processing for an occupant in the vehicle 1. The face recognition processing to be executed by the face recognition processor 51 may be executed to know a position of the occupant in the cabin. The face recognition processor 51 may not only recognize a face of the person in the cabin, but also determine the position of the person opening his or her mouth, i.e., the position of the person making a speech. A known method may be used appropriately as the face recognition processing. Its specific processing content may not be particularly limited.

The voice signal processor 53 may use voice signals respectively sent from the four microphones 15a to 15d to execute voice signal processing. In a specific but non-limiting example, the voice signal processor 53 may perform filter processing on voice signals respectively sent from the microphones 15a to 15d to calculate sound pressure, frequencies, and waveforms, for example. A known method may be used appropriately as the voice signal processing. Its specific processing content may not be particularly limited.

On the basis of voice data having undergone the processing performed by the voice signal processor 53, the voice direction determination processor 55 may determine a direction of the voice collected by the microphone 15. For example, the voice direction determination processor 55 may identify the direction of the voice on the basis of directionality of the voice collected by each of the microphones 15a to 15d. A known method may be used appropriately as the voice direction determination processing. Its specific processing content may not be particularly limited.

On the basis of the voice data having undergone the processing performed by the voice signal processor 53, the voice recognition processor 57 may recognize a content of the voice (a content of the speech) collected by the microphone 15. The voice recognition processor 57 may identify, from the content of the speech, a word indicative of an operational instruction for the travel system devices or the non-travel system devices. The voice recognition processor 57 may then recognize the operational instruction for the devices. A known method may be used appropriately as the voice recognition processing. Its specific processing content may not be particularly limited.

The voice synthesis processor 59 may execute voice synthesis processing to allow the loudspeaker 17 to repeat and emit the operational instruction recognized by the voice recognition processor 57. A known method may be used appropriately as the voice synthesis processing. Its specific processing content may not be particularly limited.

On the basis of at least either of a result of the processing performed by the face recognition processor 51 or a result of the processing performed by the voice direction determination processor 55, the speaker determination processor 61 may determine a speaker of the voice collected by the microphone 15. In a specific but non-limiting example, on the basis of the direction of the voice, which is identified as the result of the processing performed by the voice direction determination processor 55, and the position of the occupant in the cabin, which is known as the result of the processing performed by the face recognition processor 51, the speaker determination processor 61 may determine that the speaker of the voice corresponds to the driver, an occupant sitting on a front passenger's seat, or an occupant sitting on a rear passengers' seat. The speaker determination processor 61 may further recognize a position of an occupant opening his or her mouth (making a speech) on the basis of the result of the processing performed by the face recognition processor 51 to determine the speaker. A known method may be used appropriately as the speaker determination processing. Its specific processing content may not be particularly limited.

The operational intervention determination processor 63 may determine whether to permit acceptance of an operational control for the vehicle 1 to be inputted via a voice input from an occupant other than the driver (the main operator). In one embodiment, the operational intervention determination processor 63 may serve as a "determination unit". In a specific but non-limiting example, the operational intervention determination processor 63 may determine whether the driver (the main operator) is in a predetermined state where the driver (the main operator) is not possible to perform an operation or is not performing an operation. In a case where the predetermined state is determined, the operational intervention determination processor 63 may permit acceptance of an operational control for the vehicle 1 to be inputted via a voice input from an occupant other than the driver (the main operator). In the example embodiment, the operational intervention determination processor 63 may use at least one of methods described below to determine whether the driver is in the predetermined state (hereinafter the state may also be referred to as a "driving incapability state").

In a first method, the operational intervention determination processor 63 may determine that the driver is in the driving incapability state in a case where a posture of the driver is in an abnormal state. In a specific but non-limiting example, the operational intervention determination processor 63 may use an image signal outputted from the camera 13 to perform image processing to determine whether the posture of the driver is in a state inappropriate for driving the vehicle 1. Non-limiting examples of a case where it may be determined that a state is inappropriate for driving the vehicle 1 may include a case where the driver is facing down or sideways his or her face for a predetermined period of time or longer, a case where the driver is closing his or her eyes for a predetermined period of time or longer, and a case where the driver is lying on the steering wheel. The predetermined period of time at which it may be determined that one or more of such conditions as described above are satisfied may be set to a value ranging from one second to three seconds, for example, by taking into account safeness. However, other conditions than the conditions exemplified above may be set.

In a second method, the operational intervention determination processor 63 may determine that the driver is in the driving incapability state in a case where a driving operation of the driver is in an abnormal state. For example, the operational intervention determination processor 63 may continuously read information of operational amounts of a steering wheel 21, a brake pedal, and an accelerator pedal. The operational intervention determination processor 63 may then determine that the driver is in the driving incapability state in a case where one of the operational amounts is kept in an abnormal state for a predetermined period of time or longer, or in a case where a sudden change in one of the operational amounts is repeated, for example. The operational intervention determination processor 63 may also determine that the driver is in the driving incapability state in a case where input torque to the steering wheel 21 is kept to zero for a predetermined period of time or longer or the steering wheel 21 has not been rotated for a predetermined period of time or longer. The predetermined period of time at which it may be determined that one or more of such conditions as described above is or are satisfied may be set to a value ranging from one second to three seconds, for example, by taking into account safeness. However, other conditions than the conditions exemplified above may be set.

In a third method, the operational intervention determination processor 63 may determine that the driver is in the driving incapability state in a case where an occupant has performed an intervention operation. In the example embodiment, the operational intervention determination processor 63 may determine that a passenger other than the driver has performed an intervention operation, and that the driver is in the driving incapability state in a case where the operational intervention switch 11 has been turned on.

In a fourth method, the operational intervention determination processor 63 may determine that the driver is in the driving incapability state in a case where a voice of the driver or a voice of the passenger includes a word indicative of an emergency situation. In a specific but non-limiting example, the operational intervention determination processor 63 may determine whether a content of a speech includes a word indicative of an emergency situation on the basis of voice data having undergone the processing performed by the voice recognition processor 57. Non-limiting examples of a word indicative of an emergency situation may include "emergency", "emergency situation", or "SOS". In addition to the examples, appropriate words may be selected and set from words that are rarely included in ordinary conversations.

In a fifth method, the operational intervention determination processor 63 may determine that the driver is in the driving incapability state in a case where biological information of the driver is in an abnormal state. In a specific but non-limiting example, the operational intervention determination processor 63 may determine that the driver is in the driving incapability state in a case where biological information of the driver, which is acquired by a biological sensor such as a blood pressure sensor, a body temperature sensor, a heart rate meter, or an electrocardiogram sensor, indicates an abnormal value.

Upon satisfaction of one or a combination of conditions according to the first to fifth methods described above, the operational intervention determination processor 63 may permit acceptance of an operational control for the vehicle 1 to be inputted via a voice input from an occupant other than the driver (the main operator). In a case where the operational intervention determination processor 63 permits acceptance of an operational control for the vehicle 1 to be inputted via a voice input from an occupant other than the driver (the main operator), the operational intervention determination processor 63 may activate a notification device to notify that the operational input processor 65 starts acceptance of an operational input based on a voice of a passenger other than the driver. In this case, in one embodiment, the operational intervention determination processor 63 may serve as a "notification unit". A desired notification method may be applied. For example, the loudspeaker 17 may output a warning sound or a warning voice. A display device may provide a warning display. A warning light may come on.

In a case where such an operation has been performed that cancels the acceptance of an operational intervention of an occupant other than the driver, after the operational intervention determination processor 63 has permitted the acceptance of an operational control for the vehicle 1 to be inputted via a voice input from an occupant other than the driver (the main operator), the operational intervention determination processor 63 may abort the acceptance of an operational control for the vehicle 1 to be inputted via a voice input from an occupant other than the driver (the main operator). Non-limiting examples of the operation that cancels acceptance of an operational intervention may include turning off of the operational intervention switch 11, turning on of another cancellation switch than the operational intervention switch 11, and utterance, by an occupant, of a voice input indicative of cancellation of acceptance of an operational intervention.

On the basis of a content of a speech identified as a result of the processing performed by the voice recognition processor 57, the operational input processor 65 may accept an operational input based on a voice. The operational input processor 65 may follow the accepted operational input to provide an operational instruction to the travel system operational processor 71. In one embodiment, the operational input processor 65 may serve as an "input unit". Contents of speeches and contents of operational processing to be executed may be stored beforehand in a non-illustrated storage.

In a case where a content of a speech includes a word "accelerate", for example, the operational input processor 65 may accept an operational input instructing at least either of the front wheel drive motor 9F or the rear wheel drive motor 9R to perform power-driving at a predetermined output. In a case where a content of a speech includes a word "decelerate", "stop", or "brake immediately", the operational input processor 65 may accept at least either of an operational input instructing the front wheel drive motor 9F and the rear wheel drive motor 9R to perform regenerative-driving at a predetermined output or an operational input instructing the brake apparatus 25 to operate. In addition, the operational input processor 65 may be configured to refer to preliminarily-set data to accept an appropriate operational input in accordance with a content of a speech.

In a case where the operational intervention determination processor 63 has not yet determined to permit acceptance of an operational control for the vehicle 1 to be inputted via a voice input from an occupant other than the driver (the main operator), the operational input processor 65 may accept only an operational input based on a voice of the driver. In a case where the operational intervention determination processor 63 has determined to permit acceptance of an operational control for the vehicle 1 to be inputted via a voice input from an occupant other than the driver (the main operator), the operational input processor 65 may accept an operational input based on a voice of a passenger other than the main operator.

In other words, as long as the driver is assumed to be able to perform normal driving operations, the operational input processor 65 may accept only an operational input based on a voice of the driver. This makes it possible that only the driver performs intended driving operations. In a case where the driver is assumed to be not able to perform normal driving operations, the operational input processor 65 may permit acceptance of an operational input based on a voice of a passenger other than the driver. This makes it possible that the passenger deals with an emergency situation to decelerate or stop the vehicle, for example.

In a case where the driver is assumed to be not able to perform normal driving operations, all occupants may be allowed to not only deal with an emergency situation, but also perform driving operations. In this case, an operational input based on a voice of an occupant or voices of a plurality of occupants may be accepted to keep the vehicle driving. This makes it possible to instruct the vehicle to go to a desired location such as a hospital.

On the basis of an operational instruction provided from the operational input processor 65, the travel system operational processor 71 may execute operational processing for the travel system devices. In the example embodiment, the travel system operational processor 71 may execute an operational control for at least one of the front wheel drive motor 9F, the rear wheel drive motor 9R, or the brake apparatus 25. A device to be operated by the travel system operational processor 71 may not be limited to the front wheel drive motor 9F, the rear wheel drive motor 9R, or the brake apparatus 25. The travel system operational processor 71 may operate other travel system devices.

On the basis of voice data having undergone the processing performed by the voice recognition processor 57, the non-travel system operational processor 73 may execute operational processing for non-travel system devices. The non-travel system devices may include devices that do not involve traveling of the vehicle 1, among devices mounted in the vehicle 1. The non-travel system devices may not be particularly limited.

The control apparatus 50 according to the example embodiment has been illustrated in the drawings and described in here as one control apparatus. In the control apparatus 50, a plurality of control apparatuses may however be configured to communicate with each other.

3. Operational Example

Next, an example of control processing to be performed by the control apparatus 50 will now be described below with reference to a flowchart.

Figure 3:
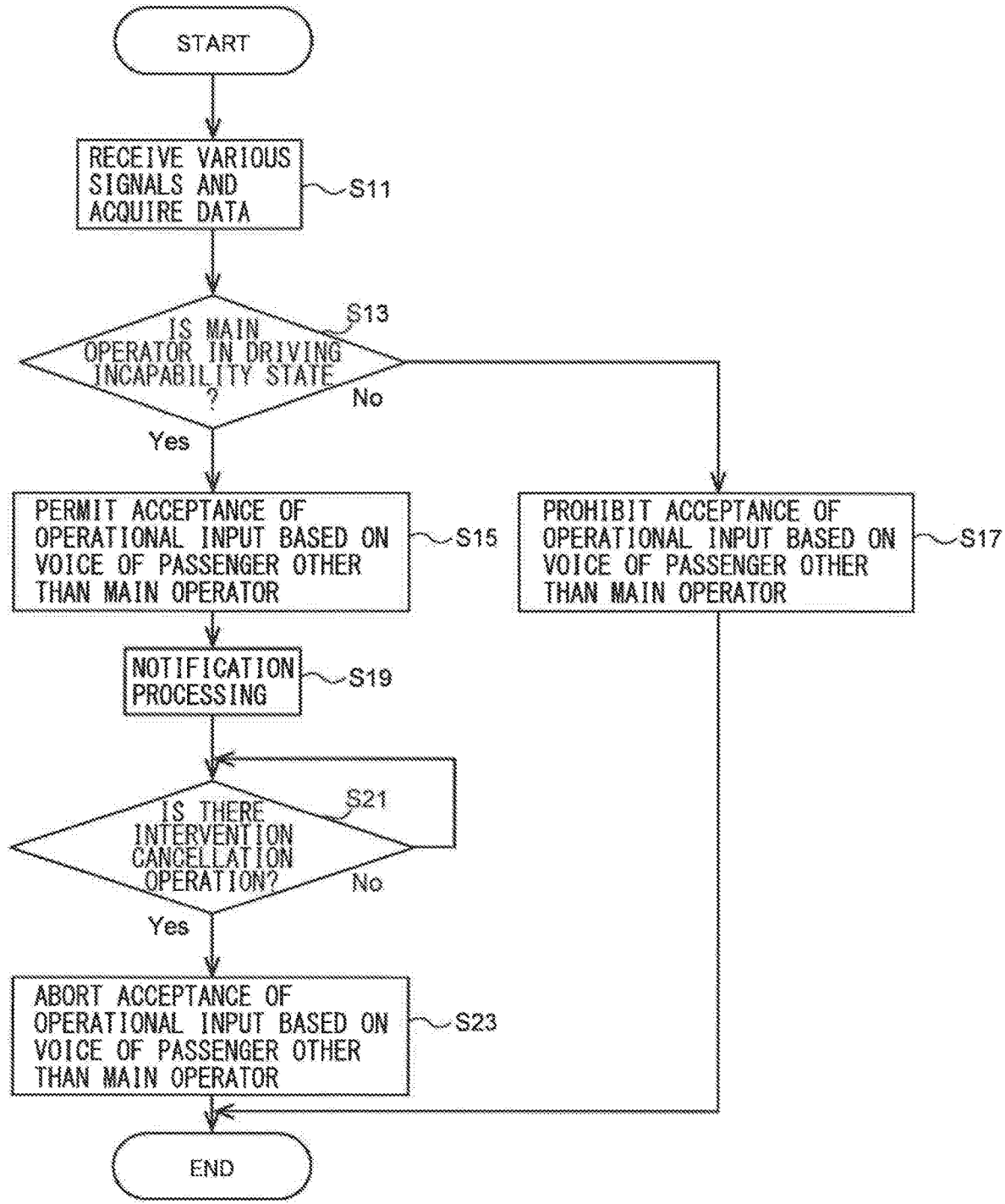
FIG. 3 is a flowchart of an example of operational intervention determination processing to be performed by the vehicle control apparatus according to the example embodiment.

FIG. 3 is a flowchart of an example of control processing to be performed by the operational intervention determination processor 63 of the control apparatus 50. The operational intervention determination processor 63 may first acquire data signals sent from the face recognition processor 51 and the voice recognition processor 57. The operational intervention determination processor 63 may receive an output signal of the operational intervention switch 11, an output signal of a steering angle sensor configured to detect a rotation angle (a steering angle) of the steering wheel 21 included in the steering system, and output signals of stroke sensors respectively configured to detect operational amounts of the accelerator pedal and the brake pedal (step S11).

Next, on the basis of the signals and the data acquired in step S11, the operational intervention determination processor 63 may determine whether the driver (the main operator) is in the driving incapability state (step S13). In a specific but non-limiting example, the operational intervention determination processor 63 may determine whether one or a combination of conditions according to the first to fifth methods described above is satisfied. The conditions may include that a posture of the driver is in an abnormal state, a driving operation of the driver is in an abnormal state, an occupant has performed an intervention operation, and a voice of the driver or a voice of a passenger includes a word indicative of an emergency situation.

Figure 4:
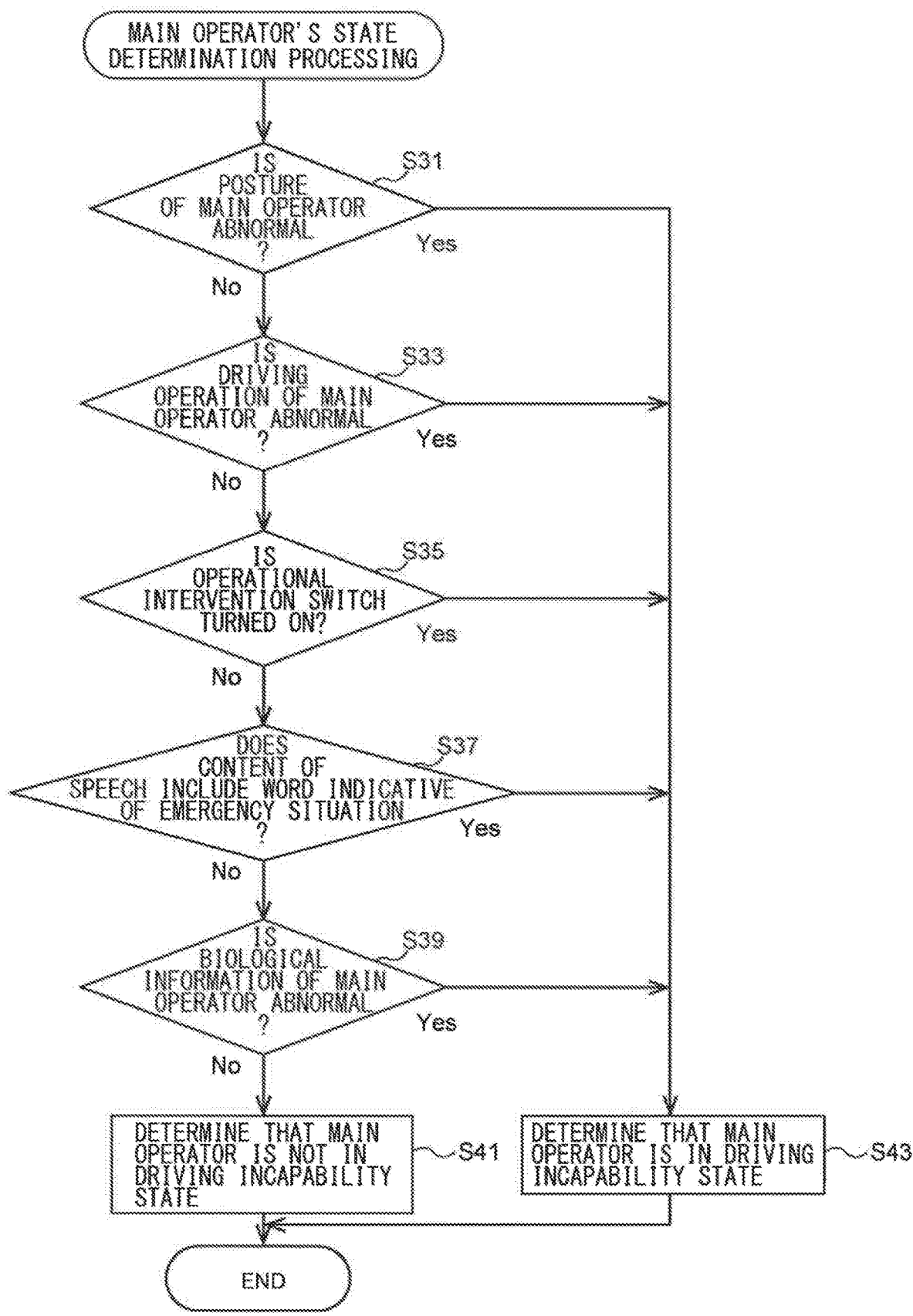
FIG. 4 is a flowchart of an example of processing, to be performed by the vehicle control apparatus according to the example embodiment, of determining whether a main operator is in a driving incapability state.

FIG. 4 is a flowchart of an example of processing of determining whether the driver (the main operator) is in the driving incapability state. The operational intervention determination processor 63 may first determine whether a posture of the driver is abnormal (step S31). In a case where the posture of the driver is determined to be abnormal (S31/Yes), the operational intervention determination processor 63 may determine that the driver is in the driving incapability state (step S43). In a case where the posture of the driver is not determined to be abnormal (S31/No), the operational intervention determination processor 63 may determine whether a driving operation of the driver is abnormal (step S33). In a case where the driving operation of the driver is determined to be abnormal (S33/Yes), the operational intervention determination processor 63 may determine that the driver is in the driving incapability state (step S43).

In a case where the driving operation of the driver is not determined to be abnormal (S33/No), the operational intervention determination processor 63 may determine whether the operational intervention switch 11 is turned on (step S35). In a case where the operational intervention switch 11 is determined to be turned on (S35/Yes), the operational intervention determination processor 63 may determine that the driver is in the driving incapability state (step S43). In a case where the operational intervention switch 11 is not determined to be turned on (S35/No), the operational intervention determination processor 63 may determine whether a content of a speech collected by the microphone 15 includes a word indicative of an emergency situation (step S37). In a case where the content of the speech is determined to include a word indicative of an emergency situation (S37/Yes), the operational intervention determination processor 63 may determine that the driver is in the driving incapability state (step S43).

In a case where the content of the speech is not determined to include a word indicative of an emergency situation (S37/No), the operational intervention determination processor 63 may determine whether biological information of the driver is abnormal (step S39). In a case where the biological information of the driver is determined to be abnormal (S39/Yes), the operational intervention determination processor 63 may determine that the driver is in the driving incapability state (step S43). In a case where the biological information of the driver is not determined to be abnormal (S39/No), the operational intervention determination processor 63 may determine that the driver is not in the driving incapability state (step S41).

The order of determining whether the five conditions are satisfied may be appropriately switched. In the example of the flowchart illustrated in FIG. 4, satisfaction or dissatisfaction for the five conditions is sequentially determined. In a case where one of the conditions is satisfied, it is determined that the driver is in the driving incapability state. Alternatively, in a case where one or a predetermined number of conditions is satisfied after determining whether all the five conditions are satisfied, the driver may be determined to be in the driving incapability state. Furthermore, although the flowchart illustrated in FIG. 4 illustrates the example of determining whether all the five conditions described above are satisfied, some of the conditions to be determined for satisfaction may be omitted.

Now back to FIG. 3, in a case where the driver is not determined to be in the driving incapability state (S13/No), the operational intervention determination processor 63 may make settings to prohibit acceptance of an operational input based on a voice of a passenger other than the driver (step S17). In a case where the driver is determined to be in the driving incapability state (S13/Yes), the operational intervention determination processor 63 may make settings to permit acceptance of an operational input based on a voice of a passenger other than the driver (step S15).

Next, the operational intervention determination processor 63 may execute processing to notify that the operational input processor 65 starts acceptance of an operational input based on a voice of a passenger other than the driver (step S19). For example, the operational intervention determination processor 63 may provide a notification, as described above. For example, the notification may be allowing the loudspeaker 17 to output a warning sound or a warning voice, allowing a display device to provide a warning display, or allowing a warning light to come on.

Next, the operational intervention determination processor 63 may determine whether such an operation of canceling the acceptance of an operational intervention is performed (step S21). For example, the operational intervention determination processor 63 may determine that the operation of canceling the acceptance of an operational intervention is performed in a case where the operational intervention switch 11 has been turned off, a cancellation switch other than the operational intervention switch 11 has been turned on, or a voice input indicative of cancellation of the acceptance of an operational intervention has been uttered.

In a case where no operation of canceling the acceptance of an operational intervention has been performed (S21/No), the operational intervention determination processor 63 may repeat execution of the determination in step S21. In a case where an operation of canceling the acceptance of an operational intervention has been performed (S21/Yes), the operational intervention determination processor 63 may abort the acceptance of an operational input based on a voice of a passenger other than the driver (step S23).

With the control apparatus 50 according to the example embodiment, as described above, it is possible to accept an operational intervention based on a voice of a passenger other than the driver in a case where the driver is in the driving incapability state.

As described above, with the vehicle control apparatus 50 according to the example embodiment, it is possible to allow a passenger other than the driver to perform an operational intervention in a case where the driver (the main operator) is determined to be in the driving incapability state. Under permission to accept an operational input based on a voice input by a passenger other than the driver, it is possible to allow the passenger to operate the steering wheel 21, as well as to make a voice input to decelerate the vehicle 1. This makes it possible to allow the passenger to move the vehicle to a road shoulder for evacuation and stop the vehicle, or to instruct the vehicle to go to a hospital, for example. Even in a case where the driver suffers from a sudden illness and loses consciousness, for example, this makes it possible to allow the passenger to immediately move the vehicle for evacuation without causing an accident, or to instruct the vehicle to bring the driver to a hospital.

The vehicle control apparatus 50 according to the example embodiment may determine that the driver is in the driving incapability state on the basis of output signals of the camera 13 and the microphone 15 mounted in the cabin, operational amounts of the travel system devices, a content of a speech of an occupant, or biological information of the driver (the main operator). This makes it possible to accurately detect that the driver is in the driving incapability state.

When the vehicle control apparatus 50 according to the example embodiment starts acceptance of an operational input based on a voice of a passenger other than the driver (the main operator), the vehicle control apparatus 50 may notify about that. This allows a passenger to easily know that the passenger is allowed to perform an operational intervention. This therefore makes it possible to allow the passenger to substitute the driver to perform travel controlling for the vehicle 1. The passenger may then immediately move the vehicle 1 for evacuation or may instruct the vehicle 1 to bring the driver to a hospital, for example.

The vehicle control apparatus 50 according to the example embodiment may cancel the acceptance of an operational intervention of a passenger in a case where an intervention cancellation operation is performed after the start of the acceptance of an operational input based on a voice of a passenger other than the driver (the main operator). This makes it possible to prevent the vehicle from returning to a state under travel controlling performed only by the main operator, i.e., the driver, even though the driver is still in the driving incapability state. In addition, it is possible to immediately return to a state under travel controlling performed only by the main operator, i.e., the driver, in a case where the driver is not surely in the driving incapability state, such as a case where the driver has temporarily closed eyes or a case where the driver looks away.

Some example embodiments of the disclosure have been described in detail with reference to the accompanying drawings. However, the disclosure is not limited to the example embodiments. It is apparent that persons skilled in the technical field of the disclosure may perceive various modification examples or alteration examples within the scope of the technical concept as defined by the following claims. It should be appreciated that the various modification examples or alteration examples obviously fall within the technical scope of the disclosure.

For example, the vehicle 1 described above in the example embodiment represents the vehicle 1 that is to be driven under control of automated driving at an automated driving level 1. In a case where an emergency situation arises, a passenger or another person performs steering operations manually. However, the disclosure is not limited to the example. It is possible to apply the disclosure to a desired vehicle as long as a person takes a role of a main operator to drive the vehicle. For example, a vehicle that is in a non-automated driving state where a driver steers the whole vehicle as well as adjusts a speed during normal driving may be configured to accept an operational input based on a voice to execute travel controlling in only a case where the driver is in the driving incapability state.

Depending on a level of automated driving for the vehicle, a main operator may not be limited to a person sitting on a driver's seat. In the example embodiment described above, the driver has been described as the main operator. However, the main operator is not limited to the driver. The main operator may be a person performing travel controlling via a voice from any position in the cabin.

In the example embodiment described above, a feedback of notifying, to the inside of the cabin, acceptance of an operational input based on a voice is not limited to a voice feedback to be provided by the voice synthesis processor 59. The feedback may be made by way of another method such as image display.

4. Comparative Example

For example, JP-A No. S60-045448 discloses a voice control apparatus for a vehicle. The voice control apparatus is configured to recognize a voice uttered for control purposes, and to control load equipment of a vehicle on the basis of a result of the recognition of the voice. The voice control apparatus recognizes only a voice of a driver to control equipment configured to control operations necessary for driving. The voice control apparatus also recognizes voices of the driver and another person to control other equipment.

JP-A No. 2017-159692 discloses an input apparatus for a vehicle. The input apparatus is configured to recognize a voice of a driver of the vehicle. In a state where acceptance of an operational input to an operation-target device among on-vehicle devices is permitted on the basis of a result of the recognition, the input apparatus further recognizes a movement of a hand in a circumferential direction of a steering wheel of the vehicle on the basis of an image in which a region including the steering wheel is captured. The input apparatus then notifies, to the operation-target device, a control instruction in accordance with the result of the recognition.

The apparatuses disclosed in JP-A Nos. S60-045448 and 2017-159692 might not allow an occupant other than the driver to be involved in driving operations in a case where the driver is in a driving-operation incapability state due to sudden illness, for example.

It is desirable to provide a vehicle control apparatus configured to allow another occupant to perform an operational intervention in a case where a main driving operator of a vehicle mounted with devices to be operationally controlled on the basis of a voice input is in a state where the main driving operator is not possible to perform an operation or in a state where the main driving operator is not performing an operation.

The control apparatus 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (C) customized to perform, and the FPGA is an integrated circuit designed to be configured after manufacturing in order to perform, all or a part of the functions of the control apparatus 50 illustrated in FIG. 2.

The invention claimed is:

1. A vehicle control apparatus to be used in a vehicle controllable on a basis of a voice input, the vehicle control apparatus comprising at least one machine readable medium storing instructions and at least one processor configured to execute the instructions to:
   determine whether a main operator who manually performs a rotation operation of a steering wheel of the vehicle is in a driving incapability state where the main operator is not able to perform the rotation operation of the steering wheel or is not performing the rotation operation of the steering wheel;
   accept an operational input based on a voice of the main operator, as well as to accept an operational input based on a voice of a passenger of the vehicle in a case where the the main operator has been determined to be in the driving incapability state; and
   execute control of acceleration and deceleration of the vehicle based on the accepted operational input based on the voice of the passenger.

2. The vehicle control apparatus according to claim 1, wherein the at least one processor is configured to execute the instructions to determine that the main operator is in the driving incapability state in a case where the main operator is lying on the steering wheel.

3. The vehicle control apparatus according to claim 1, wherein the at least one processor is configured to execute the instructions to determine that the main operator is in the driving incapability state in a case where i) input torque to the steering wheel is kept to zero for a first predetermined period of time or longer, or ii) the steering wheel has not been rotated for a second predetermined period of time or longer.

4. The vehicle control apparatus according to claim 1, further comprising an operational intervention switch, wherein the at least one processor is configured to execute the instructions to determine that the main operator is in the driving incapability state in a case where the operational intervention switch has been turned on.

5. The vehicle control apparatus according to claim 1, wherein the at least one processor is configured to execute the instructions to determine that the main operator is in the driving incapability state in a case where the voice of the main operator or the voice of the passenger includes a word indicative of an emergency situation.

6. The vehicle control apparatus according to claim 1, wherein the at least one processor is configured to execute the instructions to determine that the main operator is in the driving incapability state in a case where biological information of the main operator is in an abnormal state.

7. The vehicle control apparatus according to claim 1, wherein the at least one processor is further configured to execute the instructions to:
   provide a notification that acceptance of the operational input based on the voice of the passenger has started in a case where it is determined that the main operator is in the driving incapability state.

8. The vehicle control apparatus according to claim 2, wherein the at least one processor is further configured to execute the instructions to:
   provide a notification that acceptance of the operational input based on the voice of the passenger has started in a case where it is determined that the main operator is in the driving incapability state.

9. The vehicle control apparatus according to claim 3, wherein the at least one processor is further configured to execute the instructions to:
   provide a notification that acceptance of the operational input based on the voice of the passenger has started in a case where it is determined that the main operator is in the driving incapability state.

10. The vehicle control apparatus according to claim 4, wherein the at least one processor is further configured to execute the instructions to:
   provide a notification that acceptance of the operational input based on the voice of the passenger has started in a case where it is determined that the main operator is in the driving incapability state.

11. The vehicle control apparatus according to claim 5, wherein the at least one processor is further configured to execute the instructions to:
   to provide a notification that acceptance of the operational input based on the voice of the passenger has started in a case where it is determined that the main operator is in the driving incapability state.

12. The vehicle control apparatus according to claim 6, wherein the at least one processor is further configured to execute the instructions to:
provide a notification that acceptance of the operational input based on the voice of the passenger has started in a case where it is determined that the main operator is in the driving incapability state.

13. The vehicle control apparatus according to claim 1, wherein, in a case where an intervention cancellation operation is performed after start of acceptance of the operational input based on the voice of the passenger, the acceptance of the operational input based on the voice of the passenger is ended.

14. The vehicle control apparatus according to claim 2, wherein, in a case where an intervention cancellation operation is performed after start of acceptance of the operational input based on the voice of the passenger, the acceptance of the operational input based on the voice of the passenger is ended.

15. The vehicle control apparatus according to claim 3, wherein, in a case where an intervention cancellation operation is performed after start of acceptance of the operational input based on the voice of the passenger, the acceptance of the operational input based on the voice of the passenger is ended.

16. The vehicle control apparatus according to claim 4, wherein, in a case where an intervention cancellation operation is performed after start of acceptance of the operational input based on the voice of the passenger, the acceptance of the operational input based on the voice of the passenger is ended.

17. The vehicle control apparatus according to claim 5, wherein, in a case where an intervention cancellation operation is performed after start of acceptance of the operational input based on the voice of the passenger, the acceptance of the operational input based on the voice of the passenger is ended.

18. The vehicle control apparatus according to claim 6, wherein, in a case where an intervention cancellation operation is performed after start of acceptance of the operational input based on the voice of the passenger, the acceptance of the operational input based on the voice of the passenger is ended.

19. The vehicle control apparatus according to claim 7, wherein, in a case where an intervention cancellation operation is performed after start of acceptance of the operational input based on the voice of the passenger, the acceptance of the operational input based on the voice of the passenger is ended.

20. A vehicle control apparatus to be used in a vehicle controllable on a basis of a voice input, the vehicle control apparatus comprising circuitry configured to
determine whether a main operator of the vehicle is in a driving incapability state where the main operator who manually performs a rotation operation of a steering wheel of the vehicle is not able to perform the rotation operation of the steering wheel or is not performing the rotation operation of the steering wheel,
accept an operational input based on a voice of the main operator,
accept an operational input based on a voice of a passenger of the vehicle in a case where the main operator has been determined to be in the driving incapability state, and
execute control of acceleration and deceleration of the vehicle based on the accepted operational input based on the voice of the passenger.

* * * * *